O. R. Dinsmoor.
Hay Cock Cap.
No. 19,689.  Patented Mar. 23, 1858.
Fig. 1;
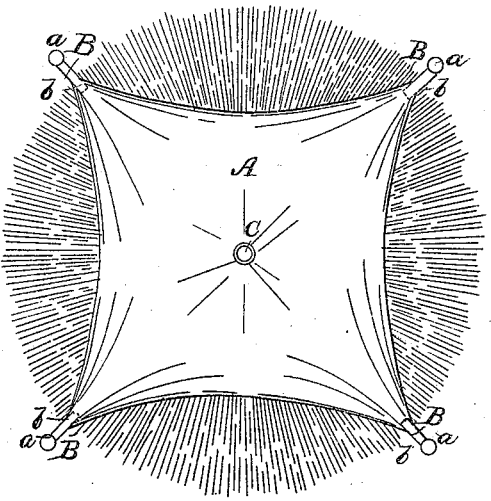
Fig. 2;
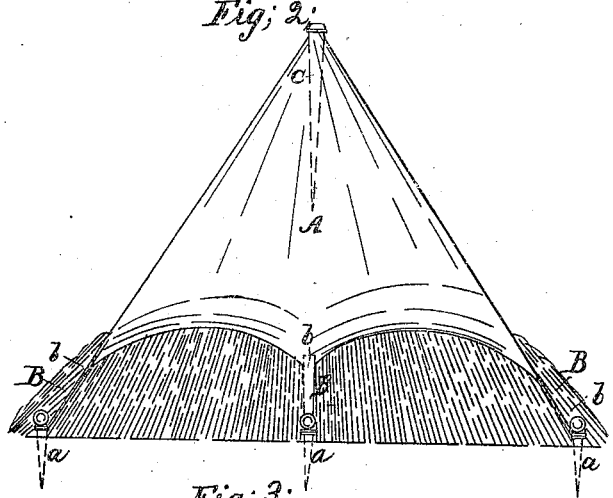
Fig. 3;
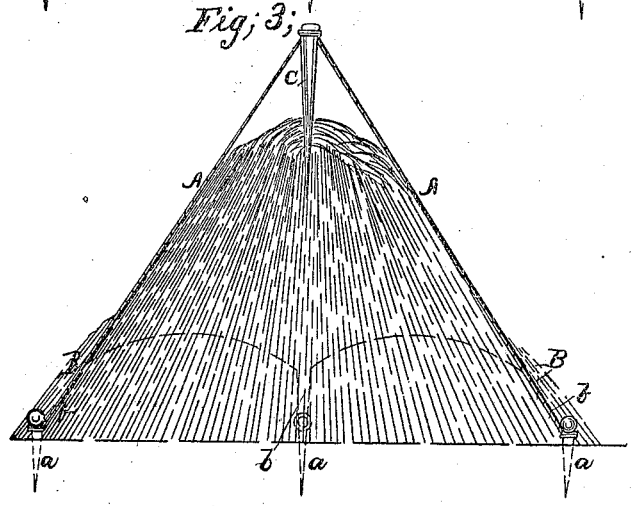

UNITED STATES PATENT OFFICE.

O. R. DINSMOOR, OF AUBURN, NEW HAMPSHIRE.

IMPROVEMENT IN HAY-COCK PROTECTORS.

Specification forming part of Letters Patent No. 19,689, dated March 23, 1858.

*To all whom it may concern:*

Be it known that I, OLONZO R. DINSMOOR, of Auburn, in the county of Rockingham and State of New Hampshire, have invented an Improved Hay-Cock Cap or Protector; and I do hereby declare that the same is fully described and represented in the following specification and the accompanying drawings, of which—

Figure 1 denotes a top view, Fig. 2 a side elevation, and Fig. 3 a transverse section, of a stack or cock of hay with my improved cover applied to it.

The main part A is made from canvas, cloth, or any other suitable material capable of protecting hay from rain, as an umbrella will protect a person therefrom. Generally speaking, this main part or body A is to be formed square, although it may be constructed of a circular or polygonal form. At each corner it is to have an elastic ground-connection, B, which may consist of a wooden pin, $a$, and an elastic rope or piece of webbing, $b$, the latter being attached at one end to the pin and at the other end to the corner of the cover A. The central or middle part of the cover is to have a tapering pin, C, extended from it, and made of sufficient length to enable it to be driven down into the middle of the upper part of the hay-cock to a firm bearing therein, and still extend above the same far enough to elevate the middle portion of the cover in a conical or tapering form above the top part of the hay-cock. The objects of such a pin are to centralize the cover to prevent it from being drawn more toward one side of the hay-cock than another, and to prevent rain or moisture from accumulating or concentrating on the top of the stack or cock, so as to run down into the same.

In the application of the protector to a hay-cock the middle pin or elevator is to be driven down into the top of the hay-cock far enough to leave the top of it projecting a few inches above the hay. Next, the pins of the ground-connections should be driven into the earth, care being taken to so arrange them in such positions that when inserted in the earth their elastic or spring webs or bands $b\ b$ may be stretched or extended, so as to draw the greater part of the cover A down closely upon the hay. After hay has been cocked the mass will shrink in size as desiccation takes place. Under these circumstances the cover will be drawn by its elastic ground-connections tightly down upon the hay-cock, whereas were inelastic ground-connections employed the cover would soon become loose and of course be detrimental rather than beneficial.

I lay no claim to a hay-cock protector made of canvas or other cloth and furnished at its lower edges with skewers or pins, by which it may be fastened on a hay-cock by driving such either into the hay-cock or the ground around the same; nor do I claim the invention of the common military tent as constructed of a hollow cone of canvas, and furnished not only with a standard or pole to enter the ground and give support to the apex of the tent, but with strings or cords and pegs or pins, by which the lower edges of the tent may be connected with the ground; nor do I claim a hay-cock protector made as represented in the specification and drawing of George and Whisnantz's application for a patent rejected November 27, 1855, for in this latter the crown piece or apex of the frame is supported on a long stake or pole of such length as to extend entirely through the hay-cock and enter the ground, whereas in my improved hay-cock protector I combine with the cover a single pin, not long enough to go through the hay and enter the ground, but only long enough to extend into the hay and project above the same sufficiently to elevate the apex or middle part of the cover so far above the top of the hay as to prevent water from forming in this part of the cover, which it would do were such part of the cover to lie flat on the hay.

My hay-cock cover is not supported on the ground by a pole extending through the hay, but it is sustained entirely by the cock of hay, and in consequence of being connected with the ground by elastic connections it accommodates itself to the cock as it shrinks in drying, the pin at the top of the cover descending at the same time with the cover, and still performing its function of maintaining the central part of the cover suitably raised above the top of the cock. Were it not for the elastic ground-connections the cover would not descend with and closely fit the hay-cock during shrinkage of the latter, as, were the connections inelastic, the cover would be loose on the pin, so that the pin would be likely to become displaced, and the water (during rains or storms) would get through the cover and upon the hay. It is by keeping the cover tightly stretched that the water is shed to advantage. Therefore the employment of the elastic ground-connections, in combination with a pin made so as to simply enter the hay and not pass through it, is the improvement which I have made, as the same is attended in practice with new and useful results not incident to the other inventions hereinbefore referred to.

What, therefore, I claim as my invention or improvement is—

Combining with the cover elastic ground-connections and a center pin, C, to extend into but not through the hay, the whole being arranged so as to operate with respect to the hay-cock, substantially as described, when applied thereto.

In testimony whereof I have hereunto set my signature this 19th day of November, A. D. 1857.

OLONZO R. DINSMOOR.

Witnesses:
JOHN GRAHAM,
HUGH B. COCHRAN.